United States Patent

[11] 3,581,008

[72] Inventors Giorgio Dal Monte
Milan;
Nicola Pitidis, Milan, Italy

[21] Appl. No. 762,752
[22] Filed Sept. 26, 1968
[45] Patented May 25, 1971
[73] Assignee Societa Italiana Telecomunicazioni Siemens S.p.a.
Milan, Italy
[32] Priority Sept. 27, 1967
[33] Italy
[31] 20935-A/67

[54] PULSE-TRANSMISSION SYSTEM
10 Claims, 5 Drawing Figs.

[52] U.S. Cl. .......... 178/63, 178/2
[51] Int. Cl. .......... H04l 25/02
[50] Field of Search .......... 178/63, 68, 2.1; 179/4, 15(B)

[56] References Cited
UNITED STATES PATENTS

| | | | |
|---|---|---|---|
| 1,605,469 | 11/1926 | Sattelberg .......... | 179/4 |
| 2,332,907 | 10/1943 | Fritschi .......... | 179/4 |
| 3,321,578 | 5/1967 | Myles .......... | 178/68 |

*Primary Examiner*—Kathleen H. Claffy
*Assistant Examiner*—Douglas W. Olms
*Attorney*—Karl F. Ross

ABSTRACT: Telecommunication system in which counting pulses or other short input signals are transmitted over a line by respective reversals of polarity which, at the receiving end, are detected and translated into a train of output pulses at a cadence corresponding to that of the train of input pulses giving rise to the polarity reversals.

INVENTORS:
Giorgio Dal Monte
Nicola Pitidis

BY

Karl G. Ross
Attorney

INVENTORS:
Giorgio Dal Monte
Nicola Pitidis
BY
Karl G. Ross
Attorney

INVENTORS:
Giorgio Dal Monte
Nicola Pitidis
BY
Karl F. Ross
Attorney

PULSE-TRANSMISSION SYSTEM

Our present invention relates to a telecommunication system having means for transmitting short input signals, such as counting pulses used in the determination of toll charges, over a line capable of transmitting direct-current voltages of either polarity.

D.C. pulses are commonly used in transmitting numerical information over relatively short lines, either by superimposing a continuous voltage upon voice currents or other A.C. message signals or by briefly interrupting the line loop to which a steady potential is being applied; in a telephone system, the latter mode of signaling is suitable only after termination of conversation in order not to create objectionable interferences with the voice-frequency currents. When pulsing is required during message transmission, the suppression of transients associated therewith is difficult; in the case of toll signals the situation is aggravated by the fact that, the longer the line, the higher (as a rule) the pulse rate so that harmonics within the voice-frequency band may have appreciable amplitudes.

Generally, the problem of noise suppression in conjunction with superimposed D.C. pulses has several aspects, i.e.:

a. the need for a relatively large pulse amplitude exceeding the permissible noise level;

b. the steepness of the pulse flanks which generate transients at high frequencies which are capacitively transmissible to adjoining lines or other parts of the system;

c. arcing, chattering of relays and similar phenomena giving rise to parasitic signals.

The principal object of our present invention, therefore, is to provide means in a telecommunication system for eliminating or at least mitigating the above-enumerated drawbacks.

More specifically, our invention aims at avoiding the need for high-amplitude current pulses and reducing the number of voltage jumps in the transmission of a given train of input pulses, advantageously with simultaneous lessening of the voltage gradient at the leading and trailing edges.

It is also an object of this invention to provide receiving circuitry eliminating the need for conventional pulse-repeating relays directly connected across the line.

These objects are realized, pursuant to the present invention, by the provision of switchover means at a first or transmitting station of a telecommunication (e.g. telephone or teleprinter) system for alternately connecting two voltage sources, of opposite polarities, to the line; upon the occurrence of any input pulse to be transmitted, the polarity of the line voltage so applied is reversed. At a second or receiving station, a detector responds to the polarity reversals to trigger a pulse-generating circuit so as to produce an output pulse upon each change in polarity, these output pulses following one another at a rate substantially identical with that of the input pulses giving rise to the polarity reversals at the transmitting station.

In this way, only a single voltage edge is transmitted over the line for each signal pulse in lieu of the two steep flanks corresponding to the leading and trailing edges of the pulses appearing on the line in conventional systems. As the recurrence rate of these voltage jumps is considerably reduced, the risk of harmful resonances within the band of signal frequencies is minimized.

At the receiving end, the polarity reversals are detected by a rectification network in the input of an amplifier, preferably in the form of one or more transistor stages, or of a pair of such amplifiers, e.g. two transistors of opposite conductivity types. The rectification network, according to a more specific feature of our invention, has two parallel branches including oppositely poled diodes which pass alternate polarity reversals to respective input electrodes (such as base and emitter) of the common amplifier or to the two oppositely conductive amplifiers; it is also possible to have a single amplifier connected for substantial saturation and cutoff, respectively, by the alternating D.C. line voltages and to differentiate the resulting square waves in the amplifier output to convert their leading and trailing edges into individual output pulses. In either case we prefer to include one or more capacitors in the rectification network; the latter may comprise one or more diodes allowing the buildup of charges of only one polarity on each of these capacitors. Conventional threshold devices, such as Zener diodes, may be used to limit the magnitude of the charge. The detector circuit may also include means for sharpening the transmitted voltage steps. The above and other features of our invention will be described in greater detail with reference to the accompanying drawing in which:

Figure 1:
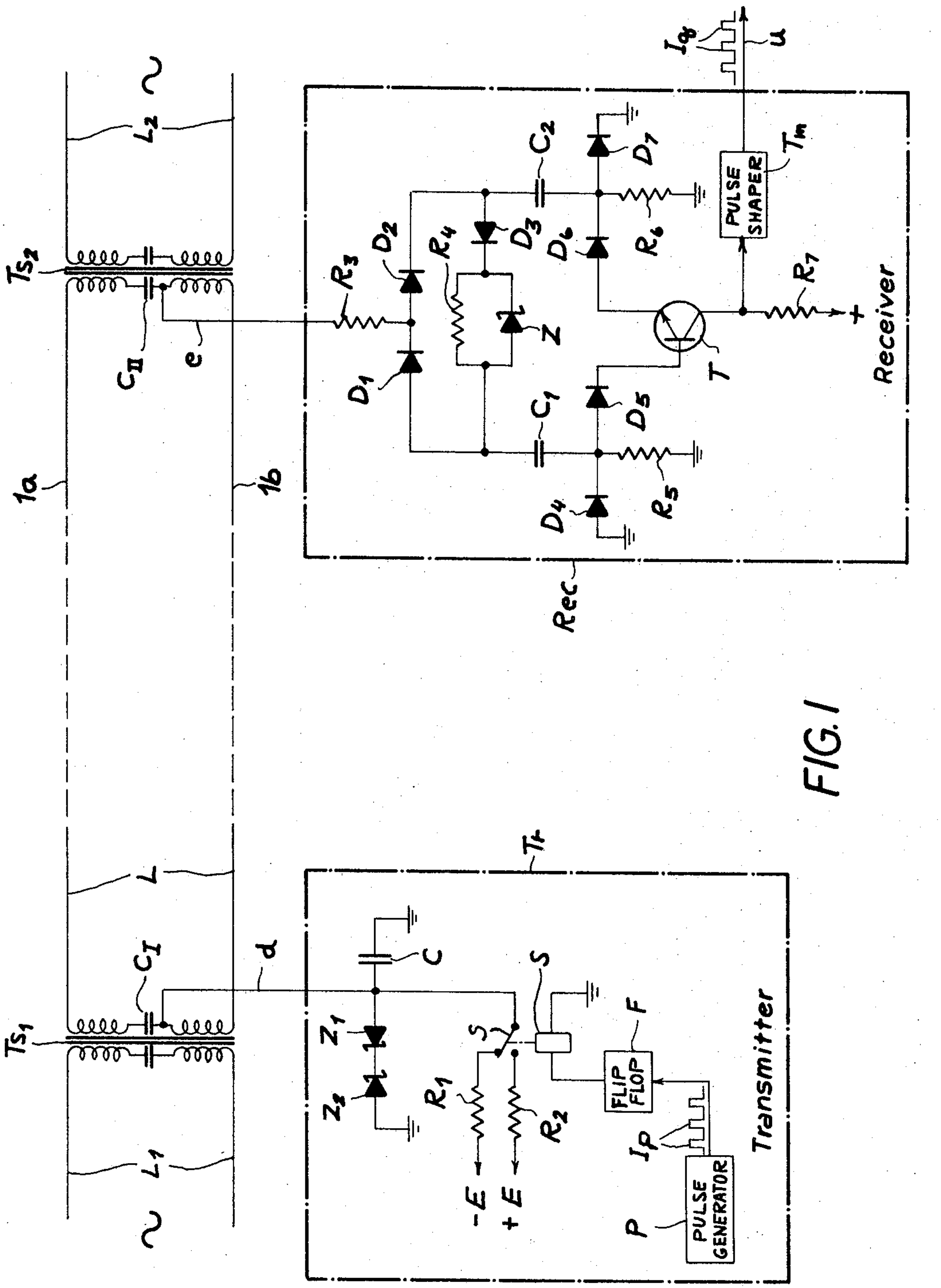
FIG. 1 is a circuit diagram showing a communication system with two stations equipped with signal-transmitting and signal-receiving means according to the invention.
Figure 5:
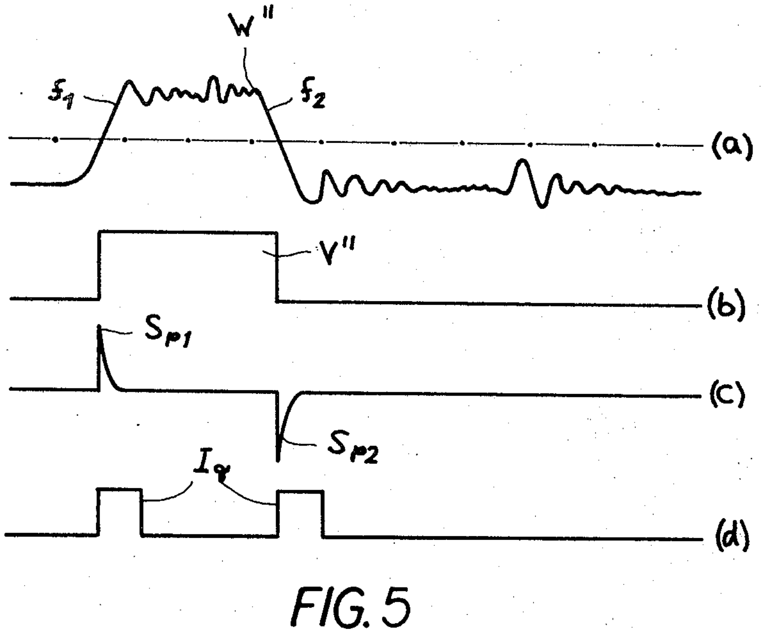
Figure 3:
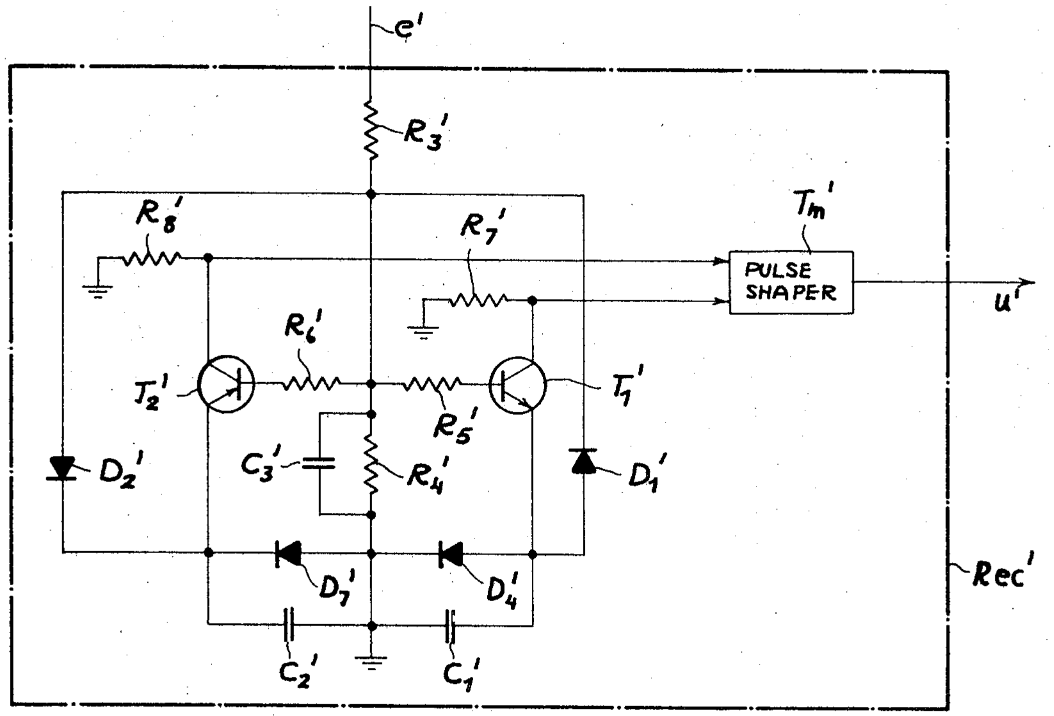
Figure 4:
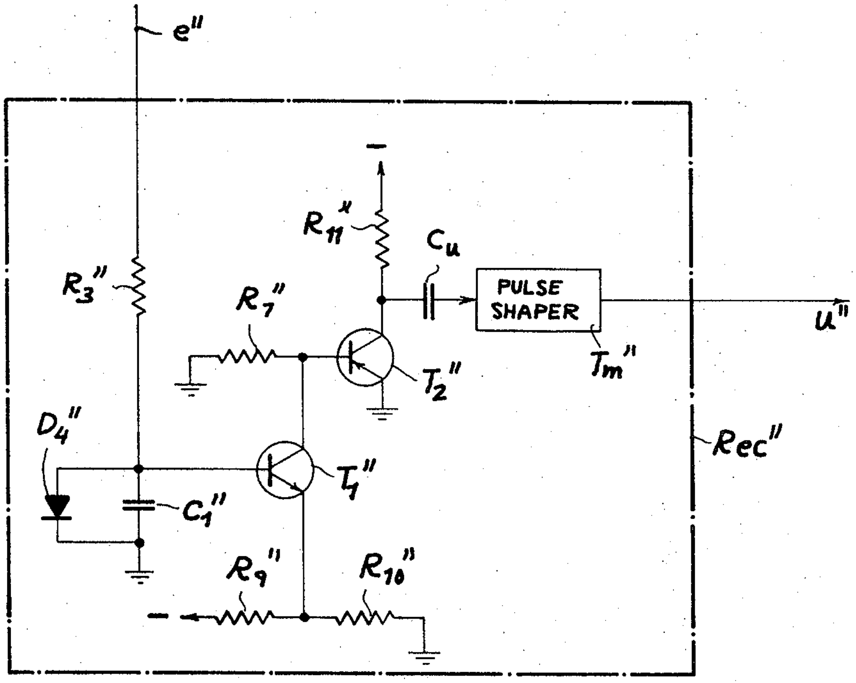

FIGS. 3 and 4 are circuit diagrams showing modifications of the receiving equipment in the system of FIG. 1; and FIG. 5 is a set of graphs relating to the operation of the receiver of FIG. 4. In FIG. 1 we have shown a telecommunication system comprising a first subscriber line $L_1$, a trunk line L and a second subscriber line $L_2$ coupled for alternating-current transmission by repeaters (illustrated as transformers) $Ts_1$ and $Ts_2$ at a first and a second station with transmitting and receiving central-office equipment Tr and Rec. Trunk line L comprises a pair of continuously conductive wires *1a*, *1b* separated by condensers $C_I$, $C_{II}$. II.Wire *1a* may be grounded or replaced by ground; wire *1b* serves for the transmission of D.C. signals as described hereinafter.

The transmitter *Tr* includes two sources −E, +E of negative and positive voltage. A switch *s*, shown as the armature of a relay S symbolizing both electromagnetic and electronic switchover means, is connected to an input lead *d* terminating substantially at the electrical midpoint of the secondary of repeaters $Ts_1$ (with an assumed direction of transmission from line $L_1$ to line $L_2$); an output lead *e* is similarly connected to the primary of repeater $Ts_2$. It will be understood that the roles of these leads may be interchanged if the call proceeds from line $Ts_2$ to line $Ts_1$, with duplication of equipment *Tr* and Rec at both stations for selective connection to the line by switches not shown. Lead *d* is grounded for alternating current through a condenser C and is also connected to ground through two Zener diodes $Z_1$, $Z_2$ arranged back-to-back. Relay S responds to current from an output electrode of a flip-flop F which is alternately set and reset by successive input pulses *Ip* from a pulse generator P; the latter may be controlled, in a manner well known per se, to emit pulses at a rate dependent upon the distance between the two exchanges serving the lines $L_1$ and $L_2$. This rate may be determined, for example, by dialing pulses originating with the calling subscriber on line $L_1$ which select the trunk L and, beyond it, the local line $L_2$ and the desired subscriber. Resistors $R_1$ and $R_2$ connect sources −E and +E to respective contacts alternately engageable by switch armature *s*.

At the receiver Rec, lead *e* conducts the signaling voltages from conductor *1b* through a resistor $R_3$ to a rectification network with two parallel branches including respective diodes $D_1$ and $D_2$ in series with a pair of condensers $C_1$ and $C_2$ as well as further diodes $D_4$ and $D_7$, the two diodes $D_1$, $D_4$ or $D_2$, $D_7$ of each branch being poled in the same sense and reversed with reference to the diodes of the other branch. A rectifying shunt arm across diodes $D_1$ and $D_2$, connected between the junctions of these diodes with their associated condensers, includes a half-wave rectifier or diode $D_3$ in series with a threshold circuit which consists of a Zener diode Z bridged by a resistor $R_4$; the magnitude of this resistor is large compared with the breakdown resistance of Zener diode Z which lies in bucking relationship with diode $D_3$. During long intervals between polarity changes, resistor $R_4$ substantially equalizes the potentials on condensers $C_1$ and $C_2$.

A transistor T, here shown to be of the NPN type, has its base connected through a diode $D_5$ to the junction of condenser $C_1$ with diode $D_4$, this junction being also returned to ground through a resistor $R_5$ which helps differentiate the charging current of this condenser. In analogous manner, the emitter of transistor T is connected to the junction of condenser $C_2$ with diode $D_7$ by way of a diode $D_6$, that junction being also grounded through a differentiating resistor $R_6$. An output resistor $R_7$ is connected to the collector of the transistor which is tied to an input terminal of a pulse shaper T*m* producing a train of output pulses I*q* on an outgoing lead *u*.

Figure 2:
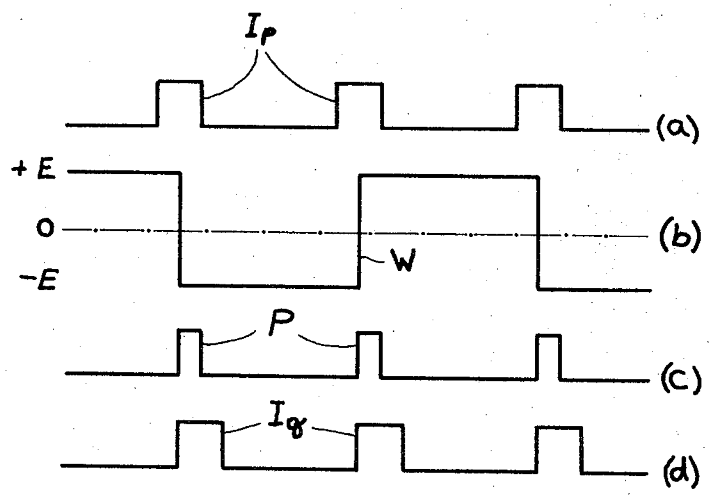
FIG. 2 is a set of graphs related to the operation of the system of FIG. 1.

The operation of the system of FIG. 1 will now be described with reference to FIG. 2. Graph (*a*) of this FIG. shows the train of input pulses I*p* whose cadence may be constant or variable. Graph (*b*) illustrates the corresponding square wave W generated by the alternate energization and deenergization of relay S as the flip-flop F is alternately set and reset by successive pulses $I_p$, the switchover from voltage +E to voltage −E or vice versa occurring at some point (not critical) during the existence of each input pulse. Positive voltage +E on lead *e* (FIG. 1) causes current flow through diodes $D_2$ and $D_7$ to charge the condenser $C_2$ until the potential difference across Zener diode Z, in the forward direction of series diode $D_3$, reaches the breakdown level whereupon condenser $C_1$ begins to charge in the same sense, the charging current passing partly through resistor $R_5$ (giving rise to a positive voltage pulse thereacross) and partly through the input circuit of transistor T by way of diodes $D_5$, $D_6$ and $D_7$ in series. Transistor T is thus turned on and generates a voltage drop across its output resistor $R_7$ in the form of a brief trigger pulse P as shown in graph (*c*) of FIG. 2. Upon reversal of the polarity on lead *e*, the positive charge on condenser $C_2$ is trapped and current now flows through diode $D_4$, condenser $C_1$, diode $D_2$ and resistor $R_3$ to negative potential until the charge of condenser $C_1$ has gone sufficiently negative to cause another breakdown of Zener diode Z; current now flows through condenser $C_2$ via diodes $D_4$ and $D_5$, the input of transistor T, diodes $D_6$ and $D_3$, Zener diode Z and diode $D_1$ to generate another trigger pulse P across output resistor $R_7$. Pulse shaper T*m* converts these pulses P into output pulses I*q*, graph (*d*), of desired amplitude and width, e.g. commensurate with the original input pulses $I_P$ from which they are but slightly staggered in time.

The receiver Rec′ of FIG. 3 comprises, in series with a lead *e*′ and a resistor $R_3'$, a rectification network whose parallel branches include respective diodes $D_1'$, $D_2'$ and condensers $c_1'$, $C_2'$; the condensers are shunted by individual diodes $D_4'$, $D_7'$ so as to be capable of acquiring only negative and positive charges, respectively. The emitter of an NPN transistor $T_1'$ is connected to the junction of diode $D_1'$ with condenser $C_1'$ whereas the emitter of a PNP transistor $T_2'$ is analogously connected to the junction of diode $D_2'$ and condenser $C_2'$. The bases of the two transistors are connected to ground through respective resistors $R_5'$, $R_6'$ and a common integrating network consisting of a condenser $C_3'$ and a resistor $R_4'$ in parallel, this network serving to shunt out voice-frequency signals and spurious oscillations. Two output resistors $R_7'$ and $R_8'$, respectively connected to the collectors of transistors $T_1'$ and $T_2'$, generate alternate trigger pulses for a pulse shaper T*m*′ designed to convert pulses of either polarity into unipolar (e.g. positive) output pulses I*q* (FIGS. 1 and 2) of desired width and height on an outgoing lead *u*′.

The operation of the receiver Rec′ of FIG. 3 differs from that of receiver Rec (FIG. 1) in that negative polarity on lead *e*′ energizes the transistor $T_1'$ whereas positive polarity energizes the transistor $I_2'$. The output leads of these transistors, beyond their junctions with resistors $R_7'$ and $R_8'$, may include further capacitors (not shown), as part of pulse shaper T*m*′, as well as rectifiers to derive spikes similar to pulses P (FIG. 2) from the leading or trailing edges of the voltage pulses developed across these resistors, generally in the manner described hereinafter with reference to FIGS. 4 and 5.

FIG. 4 shows a further receiver Rec″ comprising, in essence, a detector resembling the right-hand half of the circuit of FIG. 3. Thus, a lead *e*″ is connected through a resistor $R_3''$ to a rectification network including a condenser $C_1''$ and a diode $D_4''$ in parallel, their junction being tied to the base of an NPN transistor stage $T_1''$ whose emitter receives a suitable biasing voltage from a voltage divider $R_9''$, $R_{10}''$ connected between ground and a point of negative potential. The collector of stage $T_1''$, grounded through an output resistor $R_{l}m''''$, is connected to the base of a PNP transistor stage $T_2''$ with grounded emitter and with a collector connected to negative voltage through a load resistor $R_{11}''$. The latter collector works through an output capacitor $C_u$ into a pulse shaper T*m*″ having an outgoing lead *u*″.

Graph (*a*) of FIG. 5 shows a composite wave W″ which includes A.C. message signals together with superimposed D.C. voltages of alternate polarity. The A.C. component is filtered out by the condenser $C_1''$ so that transistor $T_1''$ sees only a positive voltage step V″ whenever the DC signaling voltage is of that polarity; negative voltages are suppressed by the rectifier $D_4''$. The flanks $f_1$, $f_2$ of the DC signal have a relatively gentle slope, owing to the provision of reactances such as condenser C (FIG. 1) in the transmitter; this reduces the accompanying transients. Transistor stage $T_1''$ may not be driven to full saturation and cutoff, respectively, by the upper and lower signal levels of graph (*a*), FIG. 5; the second stage $T_2''$, however, responds with the sharp voltage step V″ across resistor $R_{11}''$. Condenser $C_u$, together with this resistor, differentiates the leading and trailing edges of this voltage step so as to give rise to consecutive spikes $Sp_1$, $Sp_2$ of positive and negative polarity, respectively, to which the pulse shaper T*m*″ invariably responds by generating the output pulse $I_q$, graph (*d*), on lead *u*″.

The pulse shaper T*m*′ of FIG. 3 may also include second-stage transistors (e.g. of PNP type for transistor $T_1'$ and of NPN type for transistor $T_2'$) to sharpen the output pulses developed across resistors $R_7'$ and $R_8'$ prior to differentiation by R/C networks similar to circuit $R_{11}''$, $C_u$.

We claim:

1. In a communication system provided with a transmission line capable of transmitting D.C. signals from a first station to a second station, the combination therewith of:
   - a source of positive voltage and a source of negative voltage at said first station;
   - switchover means at said first station for alternately connecting said sources to a conductor of said line;
   - a generator of input pulses at said first station connected to operate said switchover means once per input pulse whereby each input pulse gives rise to a polarity reversal on said conductor;
   - detector means at said second station connected to said line and responsive to polarity reversals on said conductor;
   - and circuit means connected to said detector means at said second station for converting each polarity reversal on said conductor into a respective output pulse.

2. The combination defined in claim 1 wherein said detector means comprises amplifier means provided with an input circuit including capacitive means connected to said conductor.

3. The combination defined in claim 2 wherein said input circuit includes a rectification network with two parallel branches and oppositely poled diodes respectively connected in said branches.

4. The combination defined in claim 3 wherein said capacitive means includes a pair of condensers respectively connected in said branches in series with said diodes.

5. The combination defined in claim 4 wherein said network is provided with a rectifying shunt arm connected between respective junctions of said condensers and said diodes, said amplifier means comprising a transistor with a base and an emitter respectively connected to said branches for energization from said conductor via said diodes and condensers thereof.

6. The combination defined in claim 5 wherein said shunt arm includes a half-wave rectifier, a Zener diode in series with said rectifier and an equalizing resistor in parallel with said Zener diode, said resistor being of large magnitude compared with the breakdown resistance of said Zener diode.

7. The combination defined in claim 4 wherein said network includes two further diodes respectively connected across said condensers for preventing charge inversions thereon.

8. The combination defined in claim 4 wherein said amplifier means comprises a pair of transistors of opposite conductivity types respectively connected across said condensers.

9. The combination defined in claim 2 wherein said amplifier means is connected for substantial saturation and cutoff, respectively, by potentials of opposite polarities on said capacitive means, said circuit means including a differentiation circuit responsive to leading and trailing edges of square waves generated by said amplifier means upon alternate saturation and cutoff.

10. The combination defined in claim 2 wherein said amplifier means comprises two transistor stages of opposite conductivity types.